United States Patent [19]

Scheer

[11] Patent Number: 5,599,146
[45] Date of Patent: Feb. 4, 1997

[54] TOOL COUPLING WITH A RADIALLY ELASTICALLY EXPANDABLE COUPLING SLEEVE AND A SHAFT WITH A CLAMPING BODY

[75] Inventor: Gerhard Scheer, Loechgau, Germany

[73] Assignee: Komet Praezisionswerkzeuge Robert Breuning GmbH, Besigheim, Germany

[21] Appl. No.: 244,558

[22] PCT Filed: Nov. 24, 1992

[86] PCT No.: PCT/EP92/02701

§ 371 Date: May 31, 1994

§ 102(e) Date: May 31, 1994

[87] PCT Pub. No.: WO93/10930

PCT Pub. Date: Jun. 10, 1993

[30] Foreign Application Priority Data

Dec. 3, 1991 [DE] Germany .................. 41 39 795.9

[51] Int. Cl.⁶ ........................................ B23C 5/26
[52] U.S. Cl. ..................... 409/234; 279/83; 408/239 R
[58] Field of Search ..................... 409/232, 234; 408/238, 239 R; 279/83

[56] References Cited

U.S. PATENT DOCUMENTS 5,238,341  8/1993  Horsch ................. 408/239 R
5,257,884  11/1993  Stolz et al. ........... 408/239 R
5,388,936  2/1995  Mihic ................... 408/229 R

FOREIGN PATENT DOCUMENTS 123220  10/1984  European Pat. Off. .......... 279/83
2154481  9/1985  United Kingdom ............. 409/232

*Primary Examiner*—Daniel W. Howell
*Attorney, Agent, or Firm*— Flynn, Thiel, Boutell & Tanis, P.C.

[57] ABSTRACT

A device for linking two tool parts has a projecting shaft (12) on the first tool part (10), as well as an annular surface (20) that surrounds the shaft (12) at its root, and a projecting coupling sleeve (16) on the second tool part (14) that has a cavity (18) for receiving the shaft (12) and a front face (22) that can be pressed against the annular surface (20) during clamping. In order to achieve, besides end face clamping, also a self-centering radial clamping of the shaft (12) within the coupling sleeve (16), the shaft (12) has a cavity (24) axially open towards the front face end of the shaft and a clamping body (28) axially movable within the cavity (24). The clamping body (20) is loosely screwed with an outer thread (72) in an inner thread (70) of the hollow shaft and secured against rotation. The wall (38) of the cavity is sized so that it can elastically bulge or expand in the radial direction over the slanted flanks (26, 30) of the thread and be pressed against the inner side of the coupling sleeve (16) when the clamping body (28) is pressed in the axial direction.

39 Claims, 14 Drawing Sheets

Fig. 2e
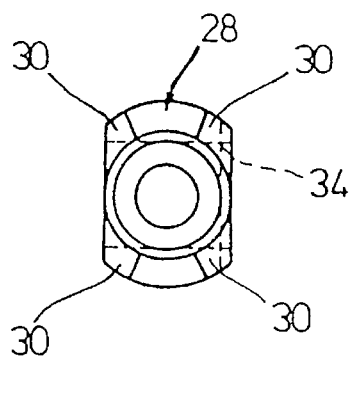
Fig. 2d
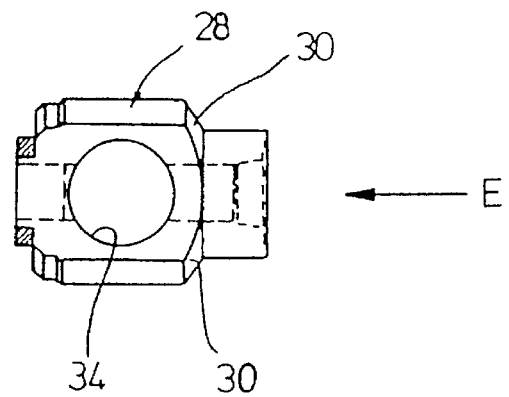
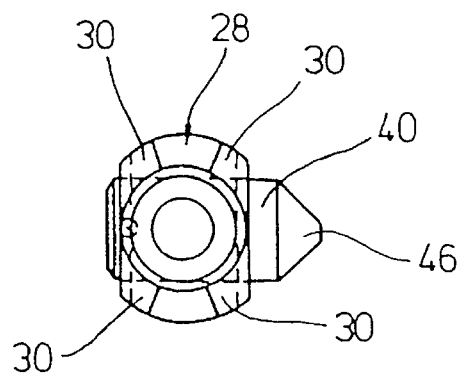
Fig. 2f

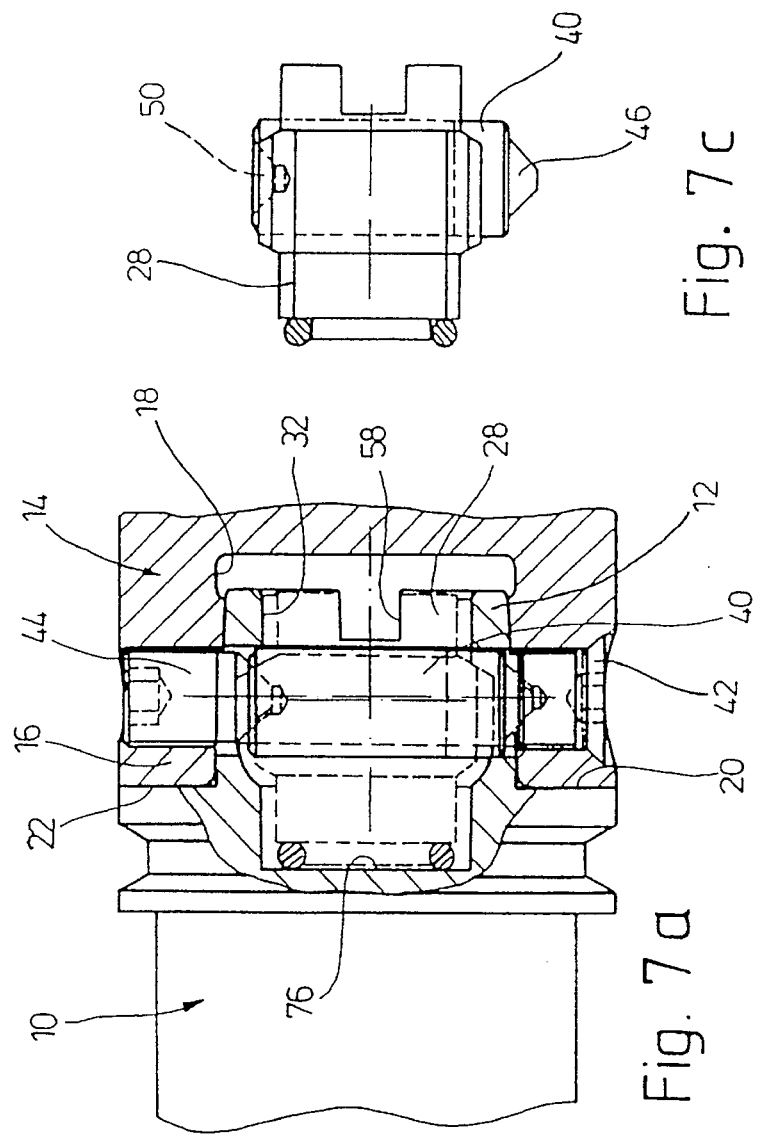
Fig. 7a
Fig. 7c
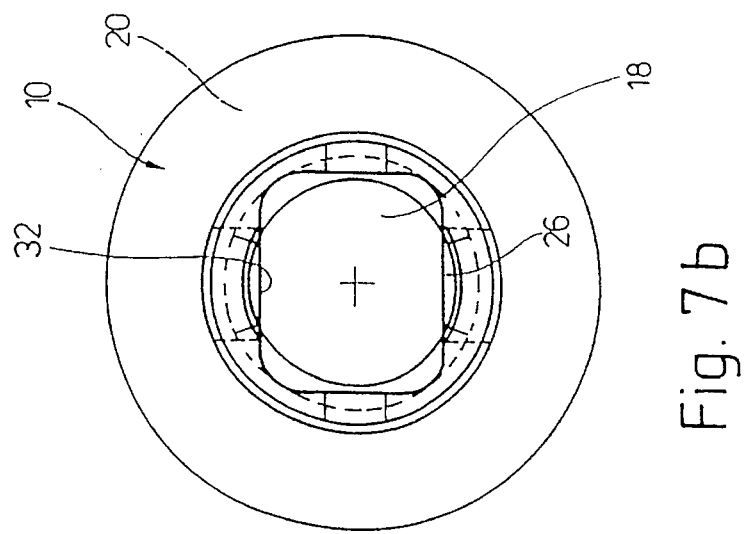
Fig. 7b

TOOL COUPLING WITH A RADIALLY ELASTICALLY EXPANDABLE COUPLING SLEEVE AND A SHAFT WITH A CLAMPING BODY

FIELD OF THE INVENTION

The invention relates to a device for connecting two tool parts to a shaft projecting from a first tool part and an annular surface surrounding the shaft at its root and with a coupling sleeve projecting from a second tool part having a recess for receiving the shaft and an end surface, which can be pressed against the annular surface, which coupling sleeve as various means for assisting connection The coupling device of the invention is designated for both the releasable coupling of tools to a machine spindle (cutting point) and also the connecting of tool parts among one another (separating point). The term "tool parts" will refer to those structural parts which have either a shaft with an annular flange or a coupling sleeve with a recess and end surface, thus in particular tool heads, extending and reducing pieces, adjusting heads, spindle attachment flanges and machine spindles.

BACKGROUND OF THE INVENTION

Coupling devices of this type are known (WO 91/03347), in which a one-part or multipart clamping bolt is movably arranged in a crossbore of the pin and having an inner or outer cone at its end and two holding screws guided in diametrically oppositely lying internal threads of the coupling sleeve, having an outer or inner cone facing toward the inside of the sleeve, and clamped with the clamping bolt during the clamping operation are provided, with the clamping bolt and the holding screw having an axial misalignment effecting during the clamping operation the pulling of the pin into the recess and the reciprocal pressing of the annular surface against the end surface. The clamping operation is released in the case of these devices, for example, by screwing in the holding screw (clamping screw) provided with the outer cone. If abutment occurs during screwing in of the clamping screw, then the forces introduced through the screw occur first on the side of the clamping screw on the clamping bolt. The clamping bolt is thereby first pressed on the side of the clamping screw against the crossbore base facing the end of the shaft such that the shaft is pulled into the recess. This occurs immediately thereafter also when the clamping bolt outer cone contacts the inner cone of the oppositely lying holding screw. As soon as a specific clamping action has occurred, a complete transformation of the radial forces into an axial component pressing the annular surface of the fitting pin and the end surface of the coupling sleeve against one another takes place. With this type of clamping a reinforcement of the connecting device in direction of the bolt results preferably.

It is furthermore known in a coupling device of the mentioned type (WO 91/03347) to design the clamping bolt in two parts and to release the clamping operation with a sliding wedge arranged between the two clamping-bolt parts and which can be axially operated through a pulling-in device arranged on the side of the machine. Here too takes place during the clamping operation a clamping of the clamping bolts provided with an outer cone and of the holding screws arranged in an internal thread of the coupling sleeve and having an inner cone. The reinforcement of the connecting device occurs here also preferably in direction of the clamping bolts.

In order to increase the resistance to bending transversely with respect to the clamping-bolt axis and in addition in order to improve the changing exactness and the dampening behavior, it is there furthermore suggested to create a four-point bearing between shaft and recess in two directions which are perpendicular to one another. In order to achieve this, the coupling sleeve is elastically expanded during the clamping operation in axial direction of the clamping bolt such that it is pressed in transverse direction thereto under an elastic reduction in diameter in diametrically oppositely lying areas with the inner surface of the recess against the upper surface of the shaft. By suitably selecting the wall thickness and the outside and inside tolerances of the shaft and of the coupling sleeve the desired four-point bearing is obtained in this manner. A further improvement in this respect is achieved by the crossbore in the shaft having a recess in the area of its base facing the end of the pin, which recess forms at its longitudinal edges an abutment for the fixed clamping bolt, and which recess results in a certain bulging of the shaft and thus in a bridging of the tolerance of fit transversely with respect to the direction of the crossbore. This effect is further reinforced by the shaft having at least one slot-shaped groove extending over the length of the crossbore and being open toward the inside of the crossbore. The groove results during the clamping operation in an expanding of the crossbore and thus in a greater bulging of the fitting pin and in the desired self-centering four-point bearing.

SUMMARY OF THE INVENTION

Based on this the basic purpose of the invention is to further improve the conventional coupling device of the above-disclosed type such that the shaft and the coupling sleeve are positioned without tolerance self-centeringly with respect to one another over a peripheral surface, which is as large as possible, by simple means.

To attain this purpose the combination of characteristics disclosed in Claim 1 is suggested. Further advantageous designs and further developments of the invention result from the dependent claims.

The invention is based on the recognition that the wall of a relatively thin-wall hollow shaft can both bulge due to a corresponding expanding-force distribution inside of the cavity and also can be changed in its outer curvature adapting to the recess curvature so that a greater bearing-pressure area in peripheral direction results.

In order to achieve this the invention suggests that the shaft has a cavity and a clamping body arranged in the cavity, that the cavity is defined by at least one inner shoulder facing inclined toward the front-face end of the shaft, against which inner shoulder a clamping surface of the clamping body can be axially pressed during the clamping operation, and that the cavity wall is dimensioned such that it can elastically bulge or expand in radial direction beyond the inclined inner shoulder and can be pressed against the inside of the coupling sleeve when the clamping body is pressed in axial direction.

A preferred embodiment of the invention provides that the clamping body and the cavity wall have cross-bores which are aligned with one another, that one-part or multipart clamping bolts, which have an inner or outer cone at their ends, are movably arranged in cross-bores, that the coupling sleeve has two holding screws which are guided in diametrically opposite internal threads, which have an outer or inner cone facing toward the inside of the sleeve and being associated with the inner or outer cone of the clamping bolt, and which can be clamped with the clamping bolt during the clamping operation, and that the clamping bolt and the holding screws have an axial misalignment effecting during the clamping operation the pulling of the shaft into the recess and the reciprocal pressing of the annular surface and of the end surface together.

In order to guarantee a sliding movement of the clamping body within the hollow shaft, which sliding movement is sufficient for the clamping operation, the crossbore in the clamping body has a smaller diameter than the crossbores in the cavity wall. The crossbores can for the same reason also be designed as slotted holes elongated in axial direction of the shaft.

The clamping operation is in the case of a one-piece clamping bolt advantageously released in the above-described manner by radial screwing in of one of the two holding screws (clamping screw).

It is basically also possible according to an advantageous embodiment of the invention that the clamping bolt has two clamping-bolt parts which are diametrically opposite to one another in the crossbore of the clamping body and extend through the crossbores in the cavity wall, and an axially movable sliding wedge, which is arranged between the clamping-bolt parts, which sliding wedge extends axially through the clamping body and with a tightening bolt through a front-face shaft opening, and which rests with wedge surfaces against complementary wedge surfaces of the clamping-bolt parts.

Another modified solution with an axial release of the clamping operation provides that the clamping body carries a tightening bolt extending through a front-face shaft opening and projecting axially beyond said clamping body, which tightening bolt can be engaged by a pulling-in device arranged on the side of the machine and can be pulled axially into the receiving sleeve. The tightening bolt can thereby be screwed to the clamping body in the front face or can have a wedge or cone supported in a conical recess of the clamping body. The clamping body can for this purpose be designed in one piece, can be partially axially parallel slotted or segment-like of many parts in order to be able to be expanded during tightening of the tightening bolt. The clamping body can be held together with a snap ring in the case of a segment-like design.

A further preferred embodiment of the invention provides that the clamping body having an elongated contour in cross section can be introduced into the cavity through the front-end shaft opening correspondingly elongated in its contour and can be positively locked within the cavity by rotating at approximately 90°.

According to a further advantageous development of the invention, the inner shoulder is formed by at least two inner-cone sections, which are spaced at an angular distance from one another and converge toward the front-face end of the cavity. It is thereby particularly advantageous when the inner shoulder is formed by two inner-cone sections which are diametrically opposite one another in the area of the longitudinal side surfaces of the elongated shaft opening. On the other hand, the clamping surface of the clamping body is advantageously divided into several surface sections which are spaced at an angular distance from one another. The surface sections are preferably conically convexly curved in adaptation to the inner-cone sections, however, they can also be curved spherically or cylindrically.

The clamping surface is advantageously formed by four bevel-like surface sections spaced at an angular distance from one another, which surface sections are arranged in the area of the corners of the part of the clamping body elongated in cross section, which part faces the inner shoulder of the cavity. The surface sections are thereby advantageously arranged in pairs at an angular distance of 30° to 50° about the shaft axis from one another. The crossbore is in this case aligned preferably transversely with respect to the longitudinal side surfaces of the clamping body elongated in cross section.

The sections of the inner shoulder and of the clamping surface, which sections rest against one another, form cone sections which are complementary to one another and which with respect to a cross-sectional plane through the shaft have advantageously a base angle of 30° to 45°.

A preferred embodiment of the invention provides that the shaft has an internal thread in the area of the cavity and the clamping body an external thread screwed into the internal thread of the shaft, and that the inner shoulder of the shaft and the clamping surface of the clamping body, which clamping surface rests against the inner shoulder, are formed by flanks of the internal or rather external thread, which flanks rest against one another and face inclined toward the front-face end of the shaft. This measure has the advantage that the inclined surface, which is needed for the expansion, can be placed at any desired point within the hollow shaft. The clamping body with its external thread is screwed advantageously essentially tension-free or loosely into the internal thread of the shaft and is form-lockingly secured against rotation in same by means of a rotation locking member. The rotation locking member can thereby be formed either by the clamping bolt extending through the crossbores or by a threaded pin radially screwed into the cavity wall and engaging with its tip a recess of the clamping body.

The internal or external thread can, for example, be designed as a sharp thread, a trapezoidal thread, a buttress thread, or a round thread, which can be optimized in their pitch, their flank angle and the number of their threads in order to achieve an as favorable as possible bulging or expanding effect. A further improvement in this respect can be achieved by weakening the hollow shaft in selected points in the area of its wall for example through a radial recess. The recess is thereby advantageously arranged inside of the cavity preferably near the root of the shaft.

In order to be able to easily insert the hollow shaft into the cavity, the hollow shaft is advantageously accessible from outside through a front-face shaft opening. The shaft opening can be closed off by a shaft lid which for this purpose can be screwed with an external thread into the internal thread of the shaft, which internal thread extends to the shaft opening, and can be pressed with a flat or conical annular shoulder against an annular end surface or a conical depression of the shaft. The shaft lid has for this purpose advantageously an axial stepped shoulder which engages a corresponding axial stepped bore of the shaft. The lid of the shaft or the shaft can have a peripheral bulge, the outside diameter of which is slightly smaller than the diameter of the shaft near the root of the shaft and at the same time defines a feed-in groove for the shaft. The cylindrical shaft has for this purpose advantageously a shaft tip conically tapering toward the annular end surface, whereas the outside diameter of the lid of the shaft or of the shaft is slightly larger in the area of the peripheral flange than the diameter of the shaft in the area of the end surface.

To adjust a definite expanding action it can furthermore be advantageous when the external thread of the clamping body is faced partially or in sections preferably at its end facing the end surface. The clamping body can furthermore have at its front-face end a forming element for attaching a screwdriver or wrench. The clamping body can furthermore have at its front-face end an axially projecting shoulder for the engagement with a corresponding recess in the lid of the shaft.

A further advantageous development of the invention provides that the clamping body has an axially through bore for a cooling medium or a cooling-medium pipe. In particular it is possible to guide a cooling-medium pipe through the clamping body and, if desired, through the clamping bolt, which pipe opens on the one side toward a bore in the lid of the shaft and on the other side penetrates into an opening in the cavity base on the side of the root. The cooling-medium pipe can either be formed on the lid or can be held sealingly by same as a single part. It is furthermore possible to provide the lid of the shaft for a better sealing on its outside with an annular recess or tapping, in which engages a seal with a corresponding profile, which seal is inserted inside of the coupling sleeve.

In order to make the bulging of the cavity wall easier, the shaft can in addition have at least one wall slot open toward the crossbore in the cavity wall, which wall slot can extend from the crossbore parallel or inclined with respect to the axis of the shaft in direction of the free shaft end and/or in direction of the annular surface and is advantageously closed toward the free end of the shaft or rather toward the annular surface. A further improvement of the expanding behavior can be achieved by the shaft having in its cavity wall at least two recesses diametrically opposite one another in pairs and open at the edge toward the front-face end, which recess is, if desired, can also be utilized for the rotation synchronization.

During the practical use it has, however, been proven to be particularly advantageous when the annular and end surfaces facing one another have grooves and projections complementary to one another for the form-locking rotation synchronization.

A preferred embodiment of the invention provides that the shaft has a cylindrical outer surface and the coupling sleeve a mating cylindrical recess.

However, it is basically also possible that the shaft has a conical outer surface converging toward the free end of the shaft and the coupling sleeve a complementary conical recess. The conical hollow shaft can thereby be dimensioned such that during the jointing of the connection already without the use of force a contacting of the flat surfaces occurs and that the radial clamping occurs only with the axial clamping. To release the connection no additional ejector is any longer needed. It is furthermore possible according to the invention that the shaft has a double cylindrical outer surface with a diameter which is smaller on the front face, and a diameter which is larger on the side of the annular surface, and the coupling sleeve has a complementary double cylindrical recess with a diameter which is larger on the front face and a diameter, which is smaller on the back side.

BRIEF DESCRIPTION OF THE DRAWINGS

The invention will be discussed in greater detail hereinafter in connection with some exemplary embodiments schematically illustrated in the drawings, in which:

FIG. 1b is a cross-sectional view taken along the line of intersection I—I of FIG. 1a;

FIG. 2b is a cross-sectional view of the tool part with a hollow shaft with an inserted clamping member in an illustration corresponding to FIG. 1a;

FIG. 2d is a side view of the clamping body;

FIG. 2e is a plan view of the clamping body in direction of the arrow E in FIG. 2d;

FIG. 2f is a plan view of the clamping body corresponding to FIG. 2e with an inserted clamping bolt;

FIG. 3b is a partially sectioned side view of the tool part having the hollow shaft, which side view is rotated at 90° with respect to FIG. 3a;

FIG. 5b shows an exemplary embodiment of a tool coupling with a tightening bolt screwed into the threaded clamping body, which exemplary embodiment is modified with respect to FIG. 5a;

FIG. 7a is a cross-sectional view of a tool coupling with a conical hollow shaft and conical coupling sleeve;

FIG. 7b is a front view of the tool part with the conical hollow shaft;

FIG. 7c is a side view of the clamping body according to FIG. 7a.

, DETAILED DESCRIPTION

Figure 1D:
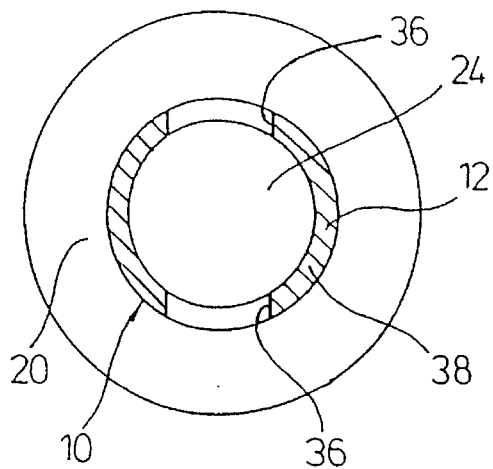
FIG. 1d is a cross-sectional view taken along the line of intersection I—I of FIG. 1b.
Figure 1B:
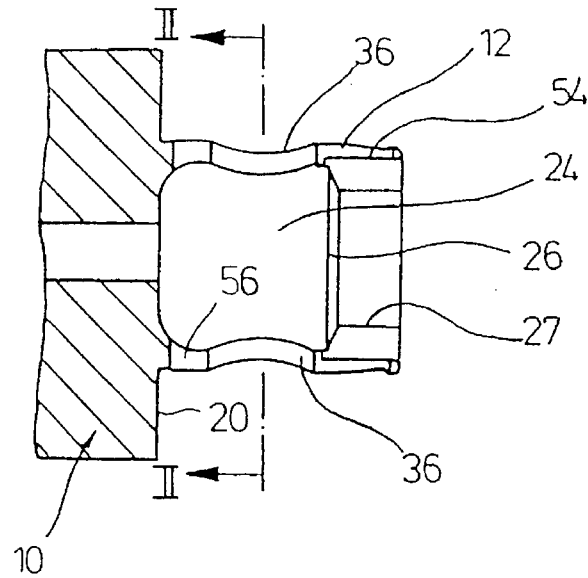
Figure 1C:
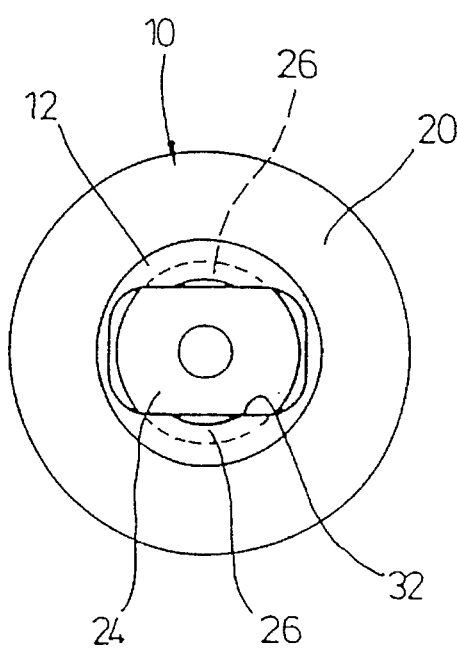
FIG. 1c is a plan view of the front end of the hollow shaft.
Figure 1A:
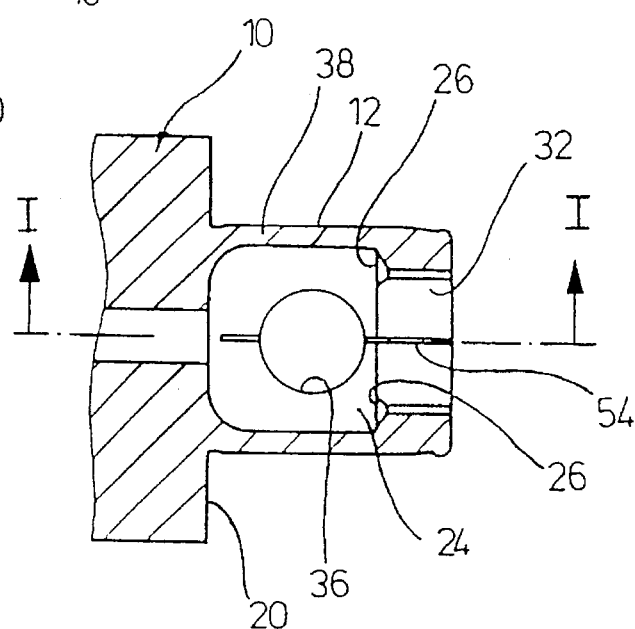
FIG. 1a is a vertical cross-sectional view of a tool part having a hollow shaft without a clamping body.

The coupling devices illustrated in the drawings are used for both the releasable coupling of tools to a machine spindle (cutting point) and also for the connection of tool parts among one another (separating point).

Figure 3A:
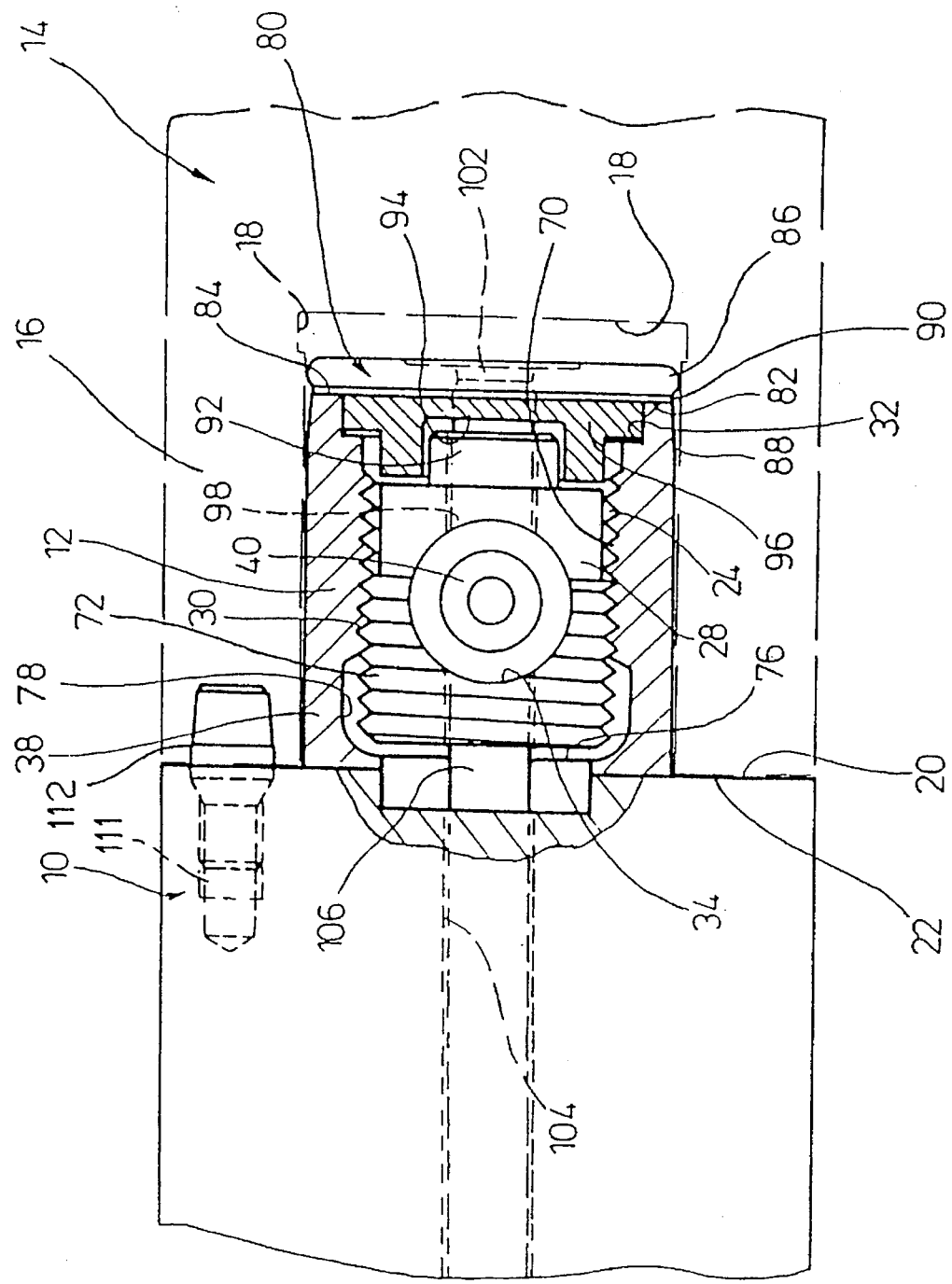
FIG. 3a is a partially sectioned side view of a tool coupling having a cylindrical hollow shaft, a one-piece clamping bolt and a threaded clamping body.
Figure 3B:
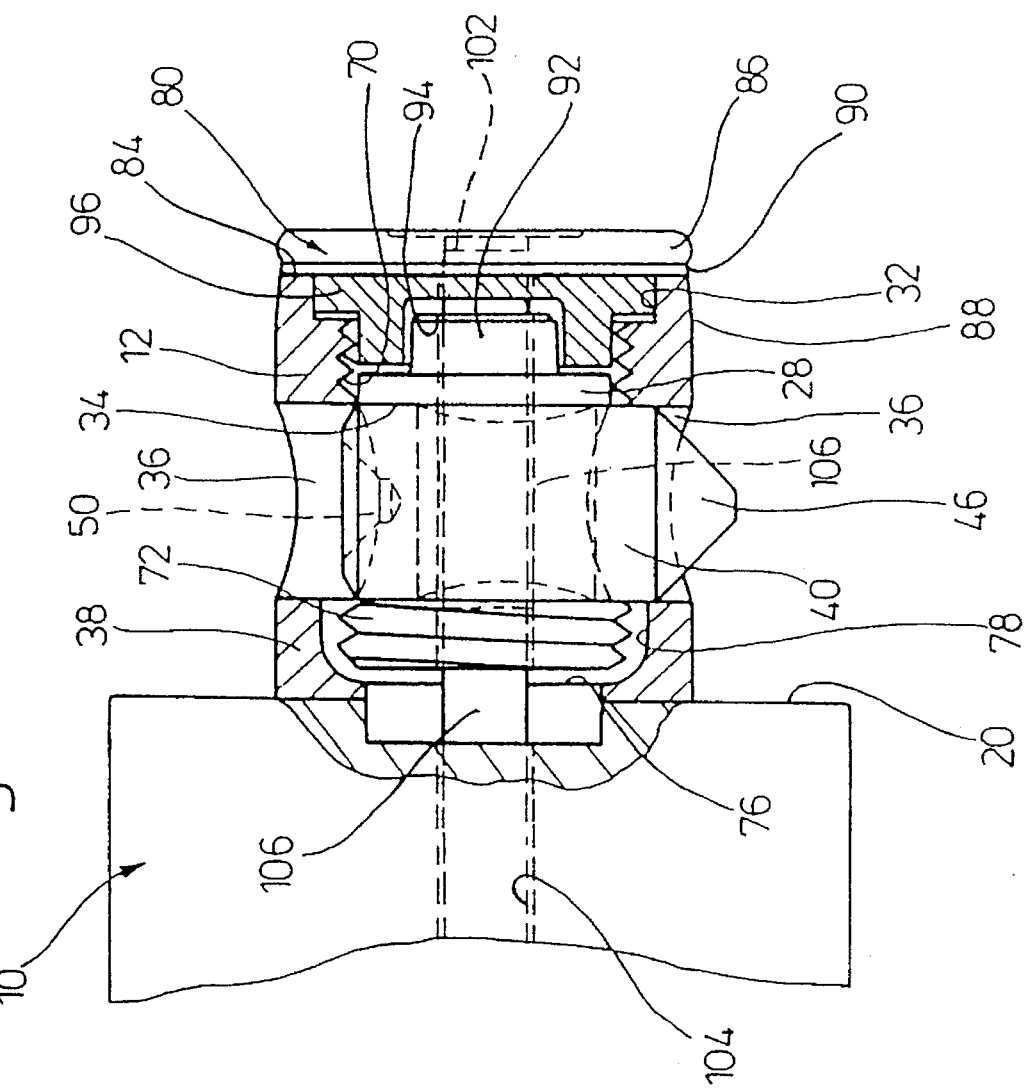
Figure 3C:
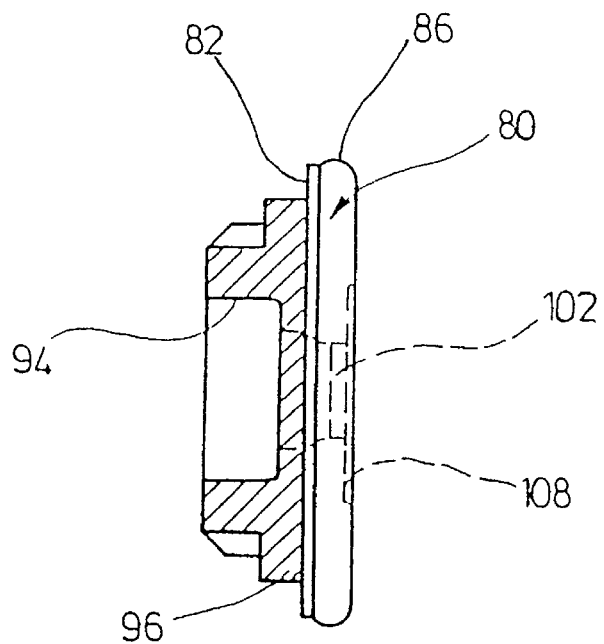
FIGS. 3c and 3d are partially sectioned illustrations of two embodiments of a hollow-shaft lid.
Figure 4A:
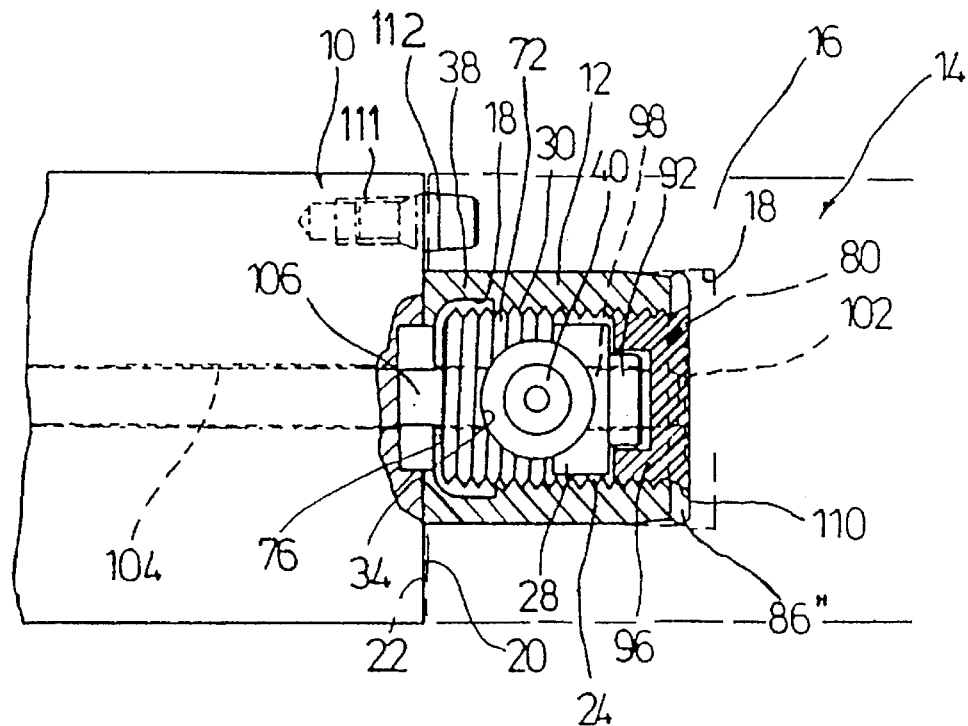
FIGS. 4a to 4d are illustrations corresponding to FIGS. 3a to 3d for an exemplary embodiment of a tool coupling, which exemplary embodiment is modified with respect to the shaft lid.
Figure 4B:
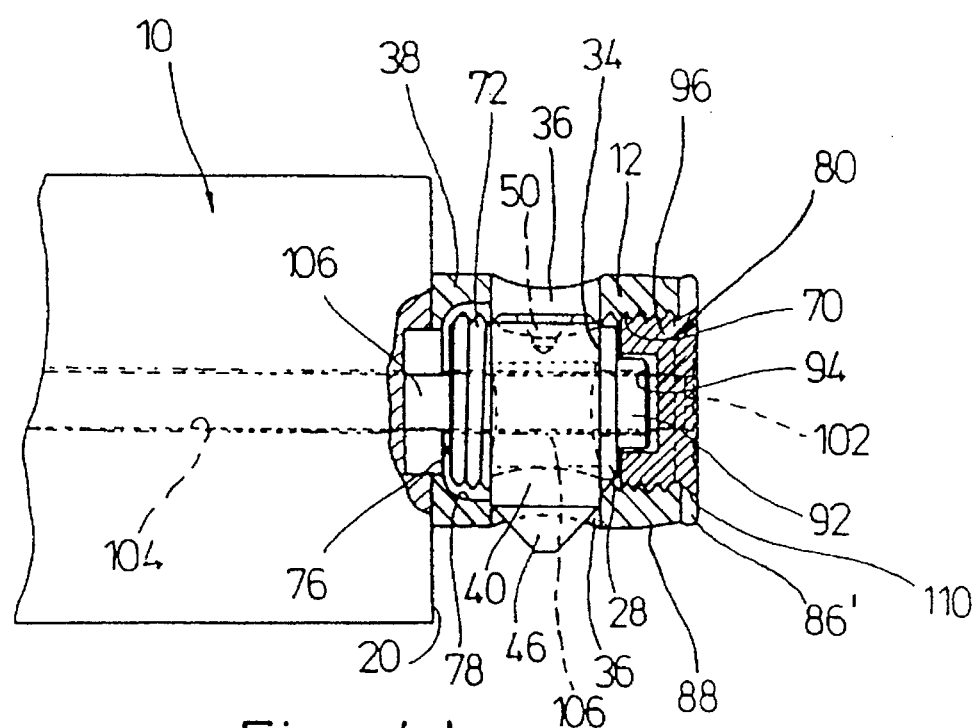
Figure 4C:
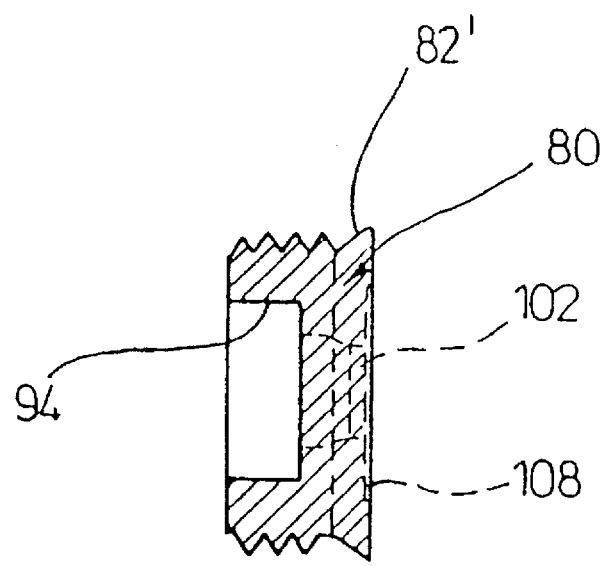
Figure 5A:
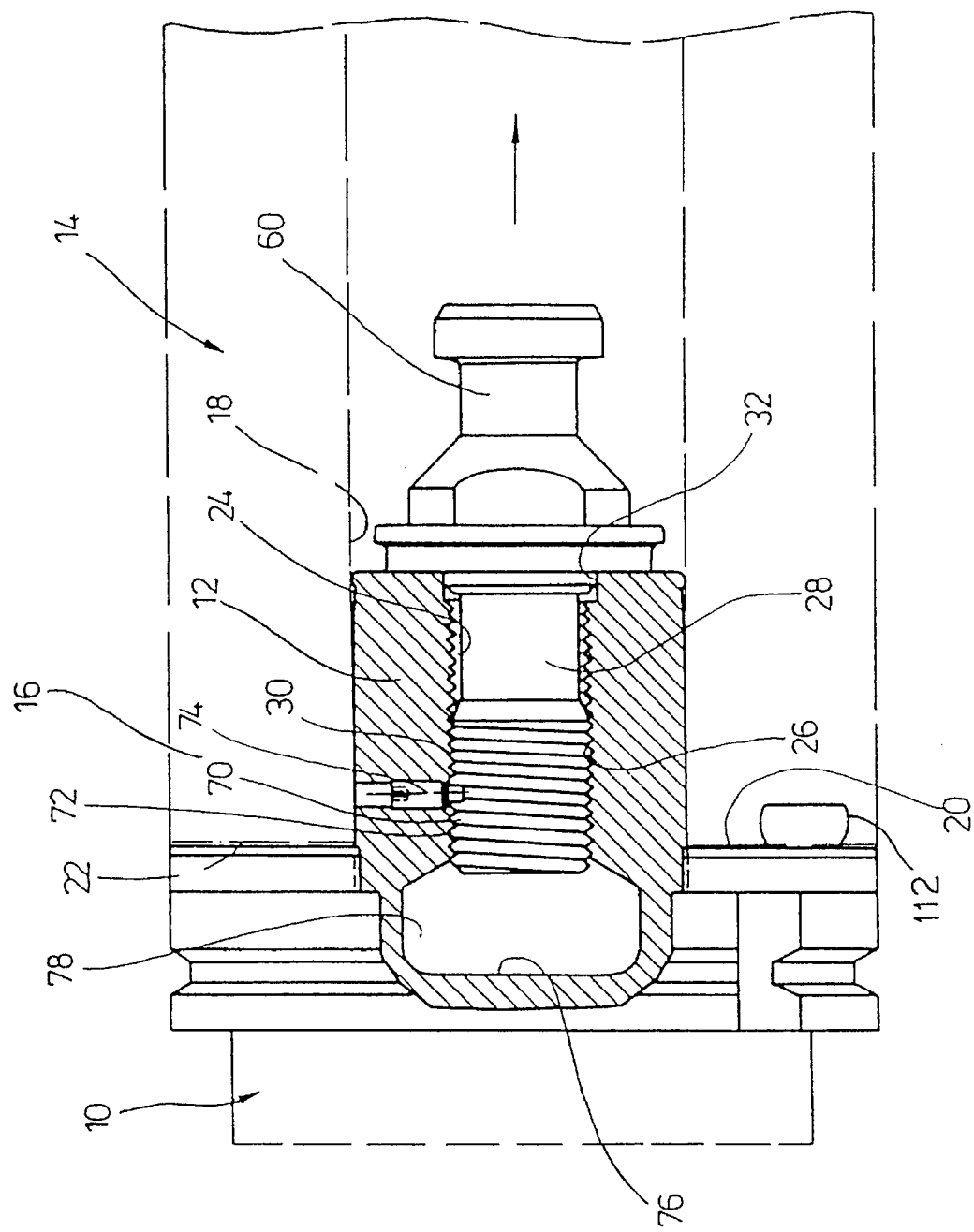
FIG. 5a is a partially sectioned side view of a tool coupling having an axially operable tightening bolt and threaded clamping body.
Figure 5B:
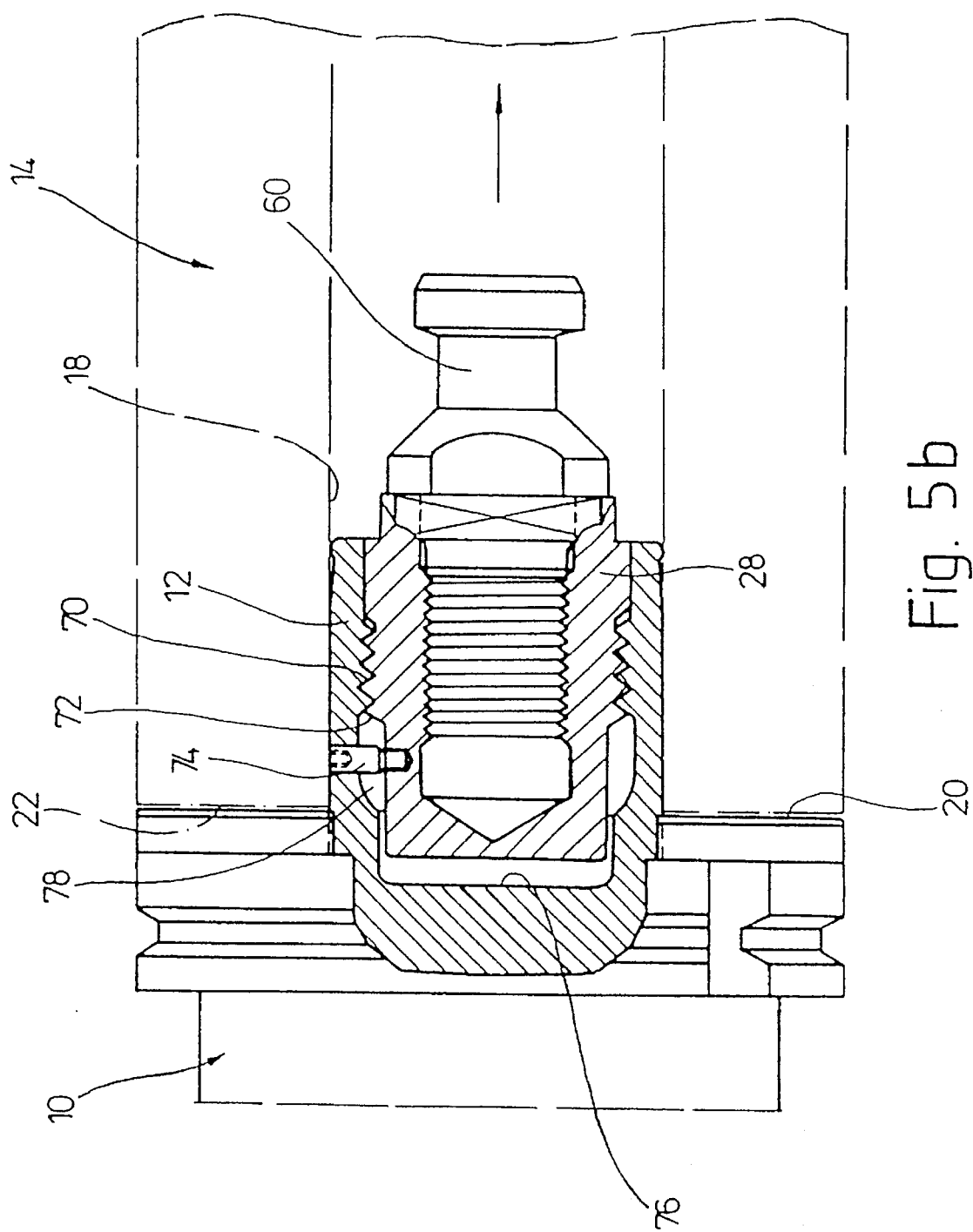

The tool couplings consist essentially of a shaft 12 axially projecting from a first tool part 10, a coupling sleeve 16 axially projecting from a second tool part 14 and a clamping mechanism for pulling the shaft 12 into a recess 18 in the coupling sleeve 16 and for producing an end face clamping between an annular surface 20 of the first tool part 10, which annular surface surrounds the shaft 12, and an annular front face 22 of the second tool part 14. FIGS. 3A, 4A, and 5A illustrate a groove 111 and a groove stone 112 complementarily engaging one another to thereby lock the two tool parts in synchronous rotation. The shaft 12 designed as a hollow shaft has a cavity 24 open toward a front facing shaft end, in which cavity is arranged a clamping body 28 part of the clamping mechanism. The clamping body 28 is during the clamping operation pressed with a clamping surface 30 axially against an inclined inner shoulder 26 of the hollow shaft 12. The wall of the cavity is thereby designed and dimensioned such that it, when the clamping body 28 is pressed in axial direction, can radially elastically bulge or expand beyond the inclined inner shoulder 26 and can be pressed against the inner side of the coupling sleeve 16 within the recess 18.

Figure 2A:
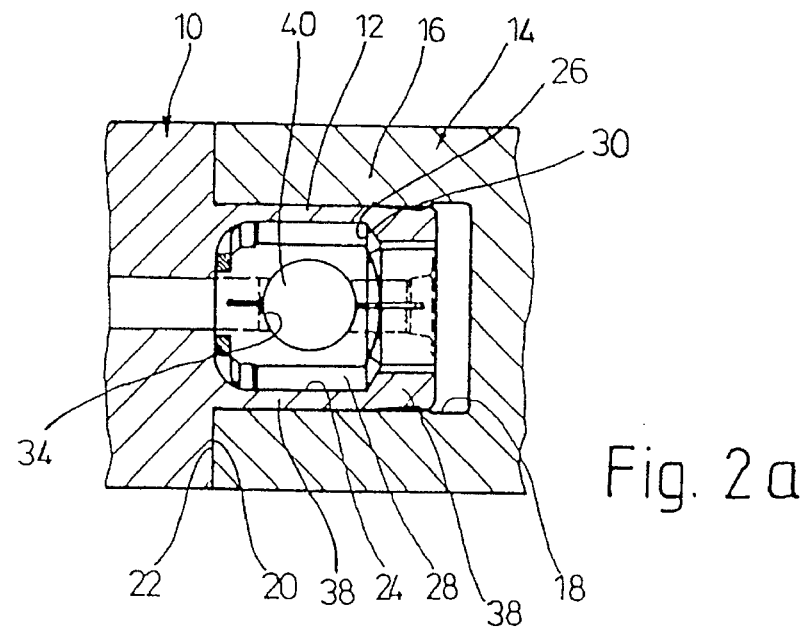
FIG. 2a is a cross-sectional view of a tool coupling with a cylindrical hollow shaft and a one-piece clamping bolt.
Figure 2B:
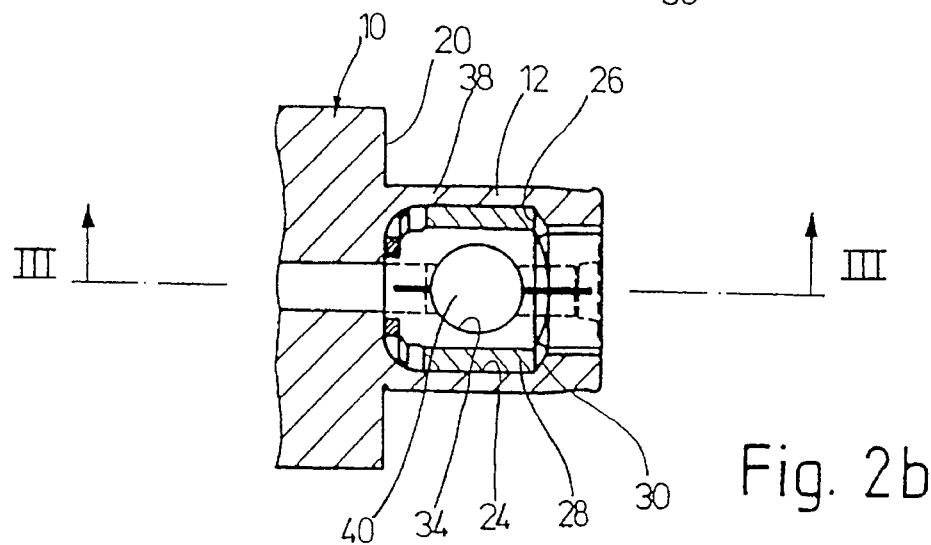
Figure 2C:
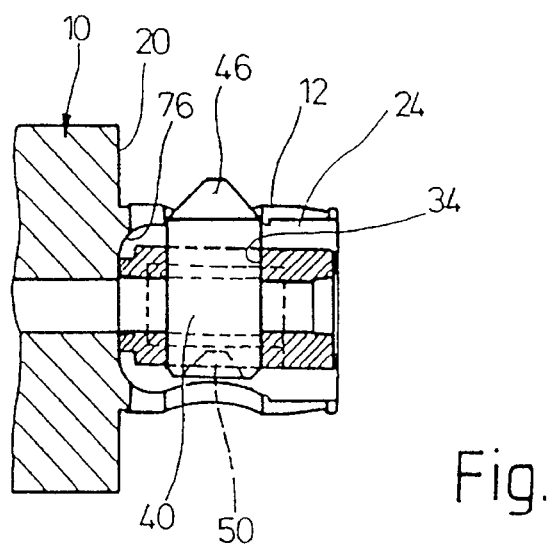
FIG. 2c is a cross-sectional view taken along the line of intersection I—I of FIG. 2b.

The clamping body 28, which has a contour elongated in cross section, is in the exemplary embodiments illustrated in FIGS. 1, 2 and 7 during installation guided through the front-face shaft opening 32 correspondingly elongated in its contour into the cavity 24 of the shaft 12 and is positively locked through rotation at approximately 90° within the cavity 24. The inner shoulder 26 is thereby formed by two inner cone sections lying diametrically opposite one another in the area of the longitudinal side surfaces of the elongated shaft opening 32. On the other hand, the clamping surface 30 is formed by four bevel-like surface sections which are spaced at an angular distance from one another, and which are arranged in the area of the corners of the part of the clamping body 28 elongated in cross section, which part faces the inner shoulder 26 of the cavity. The surface sections 30 are spaced in pairs from one another at an angular distance of 30° to 50° about the axis of the shaft. The sections of the inner shoulder 26 and of the clamping surface 30, which sections rest against one another, form cone sections complementary with one another, which cone sections have with respect to a cross-sectional plane through the shaft a cone base angle of 30° to 45°.

The hollow shaft 12 has in the exemplary embodiments illustrated in FIGS. 3 to 7 in the area of the cavity 24 an internal thread 70 and the clamping body 28 has an external thread 72 screwed into the internal thread 70. The inclined inner shoulder 26 of the hollow shaft and the clamping surface 30 of the clamping body 28, which clamping surface rests against the inner shoulder, are thereby formed by the flanks of the internal or rather external thread 70, 72, which flanks rest against one another and face inclined toward the front-face shaft end. The clamping body 28 is with its external thread 72 screwed essentially free of tension or loosely into the internal thread 70 of the hollow shaft 12 and is locked against rotation by means of a locking member 40 or 74, which will be described in greater detail later on. The cavity wall 38 is specifically weakened by a recess 78 provided near the cavity base 76 so that the hollow shaft widens during the clamping operation in the area of the root of the shaft, thus near the annular surface 20. The cavity 24 is accessible from outside through a front-face shaft opening so that the clamping body 28 can be inserted during installation through this shaft opening 80 into the cavity 24.

In the exemplary embodiment illustrated in FIGS. 3a to 3d, the cavity 24, with the clamping body 28 mounted, is closed off on the front face with a shaft lid 80 screwed from outside into the internal thread 70, which shaft lid 80 is pressed during screwing in with its annular shoulder 82 against an annular end surface 84 of the hollow shaft 12. The shaft lid 80 has an annular bulge 86 on the circumference of its annular shoulder 82, which annular bulge 86 together with the conically tapering point 88 of the hollow shaft 12 defines a feed-in groove 90 in the area of its rear flank.

The clamping body 28 has at its front-face end an axially projecting shoulder 92 which houses a forming element for a wrench or screwdriver and which in the mounted state engages a corresponding recess 94 on the inside of the lid 80 of the shaft. The lid 80 of the shaft has otherwise a stepped shoulder 96 on the inside, which stepped shoulder 96 engages a corresponding stepped bore in the area of the hollow shaft opening 32.

The exemplary embodiment according to FIG. 4 differs from the exemplary embodiment according to FIG. 3 in the annular flange 86' defining the feed-in groove 90 being formed on the hollow shaft 12 and the shaft lid 80, which is screwed with its external thread into the internal thread 70 of the hollow shaft 12, resting with a conical annular shoulder 82' against a conical depression 110 formed at the end of the internal thread 70. The mentioned differing characteristics have mainly advantages regarding the production requirement: The internal thread 70 can be guided up to the hollow shaft end; a fitted recess for receiving the stepped shoulder 96 is not needed.

Figure 3D:
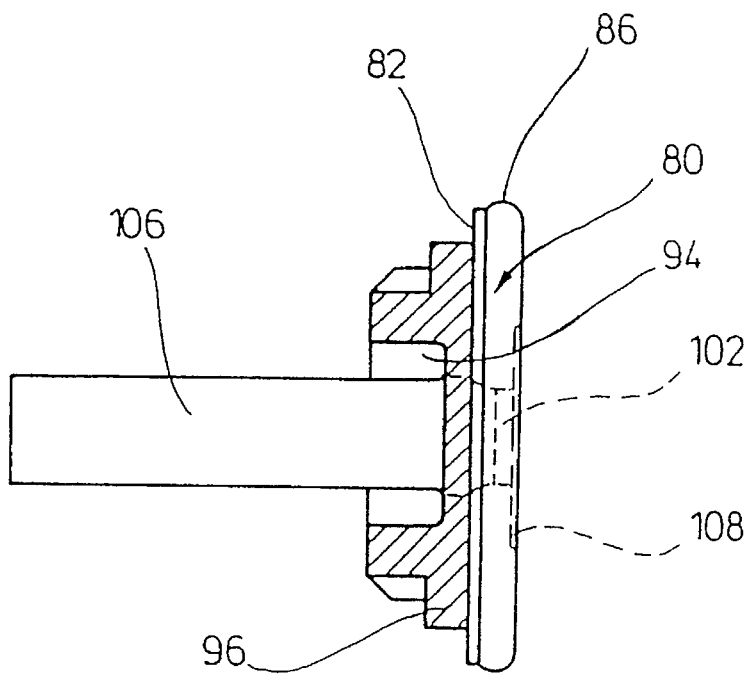
Figure 4D:
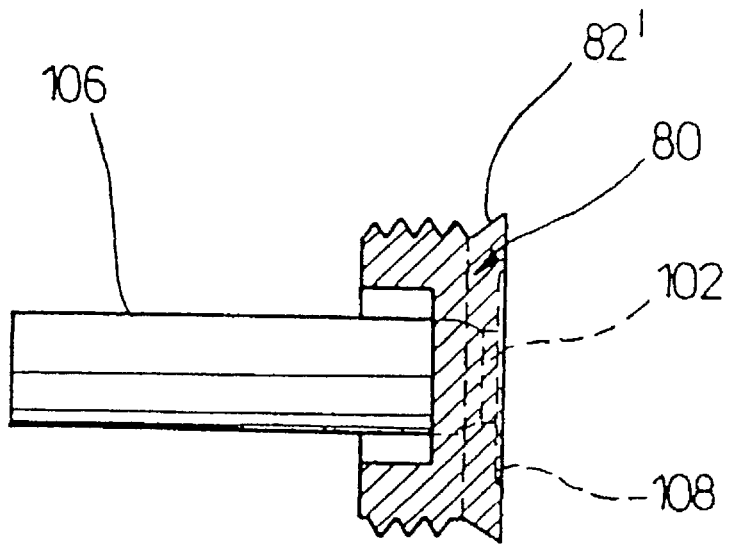

As can be seen particularly in FIGS. 3a and 4a, the clamping body 28 has an axial through bore 100, through which a cooling-medium pipe 106 is placed, which cooling-medium pipe 106 extends between a center opening 102 in the lid and an opening of a cooling-medium channel 104, which opening is arranged on the side of the cavity base 98. The cooling-medium pipe 106 can be designed as a separate part or can be fastened or formed on the inside of the lid 80 of the shaft (FIG. 3d, 4d). The lid 80 of the shaft has on its outside a recess 108 annularly surrounding the center opening 102, into which recess 108 can be introduced a seal with a corresponding profile, which seal is inserted inside of the coupling sleeve 16.

Figure 8:
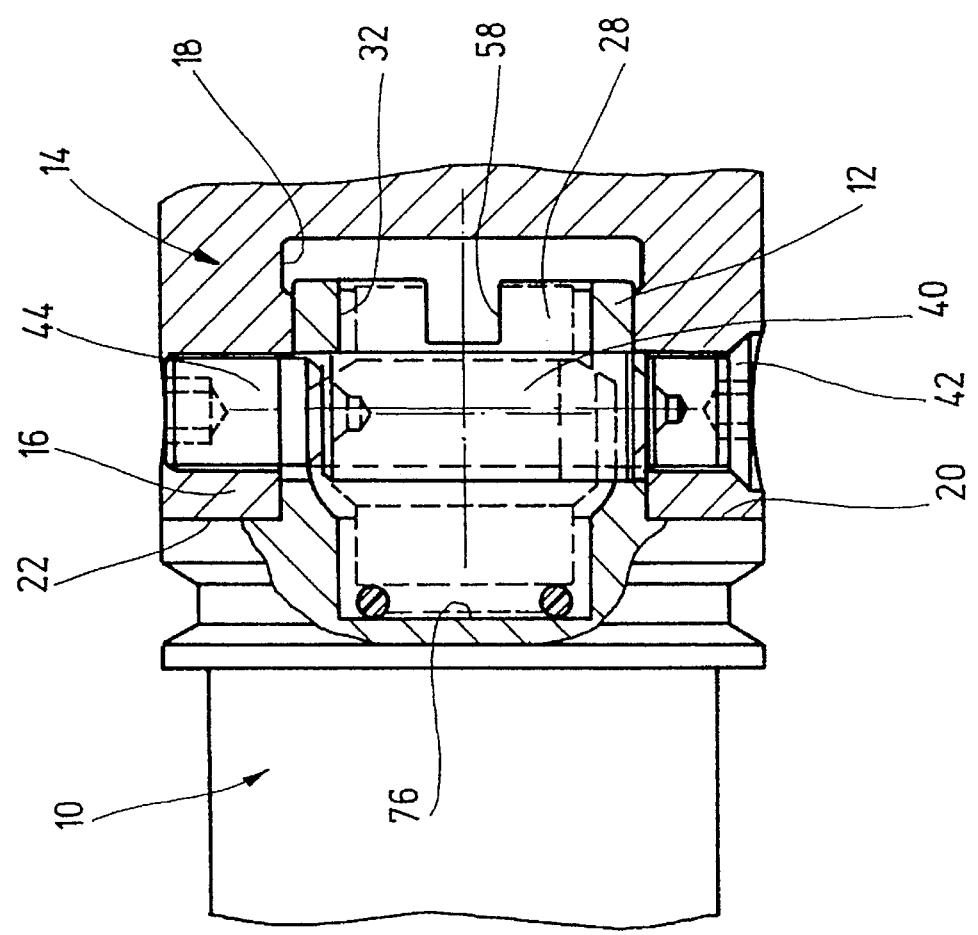
FIG. 8 is a cross-sectional view of a tool coupling with a hollow shaft having a double cylindrical outer surface and a coupling sleeve having a complementary double-cylindrical recess.

The hollow shaft 12 in the exemplary embodiments of FIG. 1a to 6 has a cylindrical outer surface and the coupling sleeve 16 a corresponding cylindrical recess 18, whereas the hollow shaft 12 in the exemplary embodiment of FIG. 7a has a conical outer surface converging toward the free end of the shaft and the coupling sleeve 16 has a complementary conical recess 18. In an exemplary embodiment illustrated on FIG. 8 and differing from the above the hollow shaft 12 can also have a double cylindrical outer surface with a diameter which is smaller on the front face, and a diameter which is larger on the side of the annular surface, and the coupling sleeve 16 can have a complimentary double cylindrical recess with a diameter, which is larger on the front face, and a diameter, which is larger on the back side.

In the exemplary embodiments illustrated in

FIGS. 2, 3, 4 and 7 the clamping mechanism contains a one-piece clamping bolt 40 movably arranged in a crossbore 34 of the clamping body 28 and in crossbores 36 in the cavity wall 38 and two diametrically opposite holding screws 42, 44 guided in the internal threads of the coupling sleeve 16. The clamping bolt engages with its outer cone an inner cone of the adjacent holding screw 42 and has at its end opposite the outer cone an inner cone for receiving an outer cone formed on the holding screw 44. The crossbore 34 of the clamping body is moved through the crossbores 36 in the cavity wall 38 into the already mounted clamping body 28. The clamping bolt 40 is subsequently mounted and takes on at the same time the function of the rotation locking member for the clamping body 28.

To create the connection between the two tool parts 10, 14, the shaft 12, with the holding screw 44 being unscrewed, is loosely guided into the recess 18 of the coupling sleeve 16. During the subsequent screwing of the holding screw 44 into the associated internal thread, the holding screw 44 and the clamping bolt 40 first come into contact in the area of the cone surfaces facing one another. During the further course of the clamping operation the clamping bolt 40 is moved with its outer cone 34 until it contacts the holding screw 42 into its inner cone. The actual clamping operation starts in this state: The clamping forces introduced through the holding screws 42, 44 are first converted through the conical contact surfaces based on the existing axial misalignment into an axial force pressing the clamping body 28 with its clamping surface 30 (external thread 72) against the inner shoulder 26 (internal thread 70). With this the shaft 12 of the tool part 10 is pulled into the recess 18 of the coupling sleeve 16 until the annular surface 20 contacts the end surface 22. Upon a further tightening of the holding screw 44, an end face clamping between the annular surface 20 and the end surface 22 occurs. Furthermore by suitably dimensioning the cavity wall 38 an elastic bulging or expanding of the cavity wall 38 occurs through the axially acting clamping body 28 through the inner shoulder 26 or rather the internal thread 70, which cavity wall 38, bridging the tolerance of fit, is pressed against the inside of the coupling sleeve 16 in the area of the recess 18.

To reinforce this effect, the hollow shaft 12 has in the exemplary embodiment illustrated in FIGS. 1 and 2, a total of four wall slots 54, 56, which lie diametrically opposite one another in pairs and are open toward the crossbores 36 in the cavity wall 38. The wall slots 54, 56 extend parallel to the shaft axis in direction of the free shaft end or rather in direction of the annular surface and are closed toward the free shaft end or rather toward the annular surface.

For a further improvement in this respect, the hollow shaft 12 (FIG. 7) can have two diametrically opposite recesses 58 which are open from their edge toward the front-face end in the cavity wall 38, which recesses 58, with a suitable design of the coupling sleeve 16, can also be used for the form-locking rotation synchronization.

Figure 6:
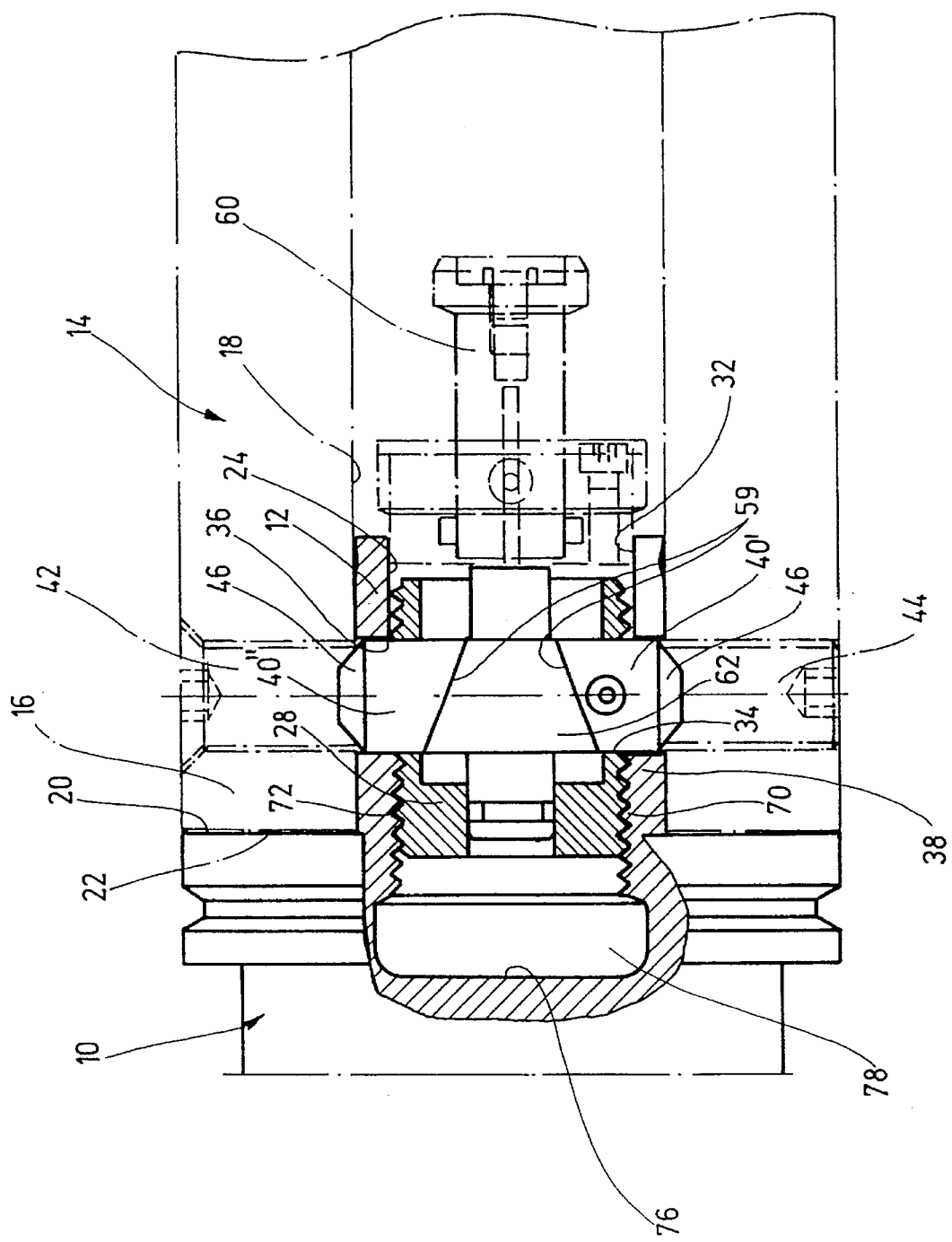
FIG. 6 is a partially sectioned side view of a tool coupling with a two-piece clamping bolt, sliding wedge and threaded clamping body.

The exemplary embodiment designed as a spindle coupling and shown in FIG. 6 differs from the exemplary embodiment according to FIGS. 3 and 4 in the clamping bolt 40 being divided into two parts 40', 40", which are diametrically opposite in the crossbore 34 of the clamping body 28 and in the crossbores 36 of the cavity wall 38, and in the clamping operation being releasable through a sliding wedge 62 acting against inner wedge surfaces 59 of the clamping bolt parts 40', 40"and axially movable through a tightening bolt 60 within the clamping body 28. The holding screws, which are in broken lines illustrated on FIG. 6 and which have an inner cone, are there advantageously screwed from inside of the recess 18 into the internal thread of the coupling sleeve 16 and form a receiving means for the outer cones 46 of the clamping bolt parts 40',40". The clamping operation results in a force transfer onto the tool parts 10, 14, which are to be connected with one another, which force transfer corresponds to FIGS. 2, 3, 4 and 7, so that reference can be made to the above discussions regarding this.

Figure 5C:
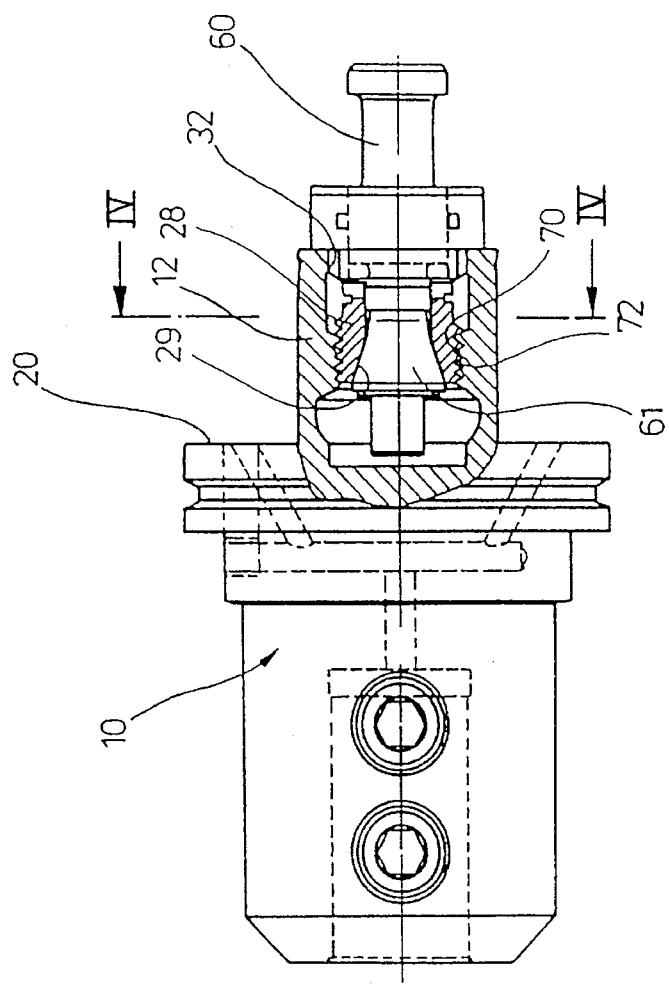
FIGS. 5c and 5d are partially longitudinal and crosssectional taken along line IV—IV illustrations of a further modified exemplary embodiment of a tool coupling with axially operable tightening bolts supported in tightening direction with a cone on the threaded clamping body.
Figure 5D:
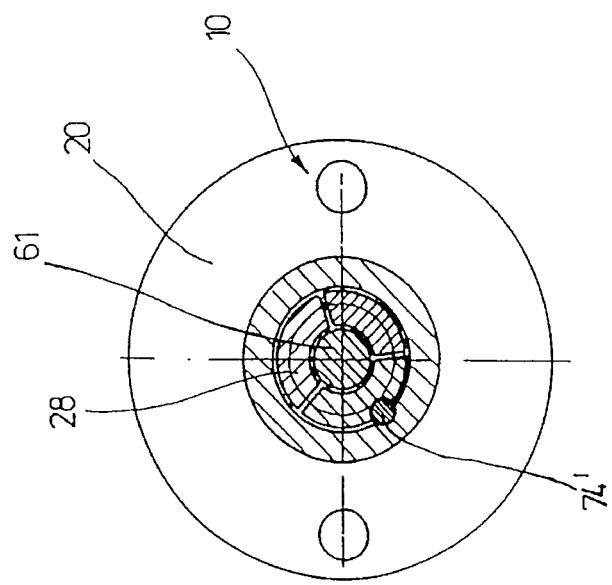

FIGS. 5a to 5d show three further tool couplings designed as a spindle coupling, which tool couplings are simplified with respect to the clamping mechanism compared with the exemplary embodiment according to FIG. 6 by not requiring the use of a clamping bolt 40. The tightening bolt 60 projecting beyond the front-face shaft opening 32 is here rigidly connected to the clamping body 28 (FIG. 5a), screwed to same (FIG. 5b) or wedged (FIGS. 5c and 5d). As a lock against rotation for the clamping body 28, which is loosely screwed with its external thread 72 into the internal thread 70 of the hollow shaft 12, there is provided a threaded pin 74, 74' radially (FIGS. 5a and 5b) or axially (FIGS. 5c and 5d) extending into a recess of the clamping body 28. The clamping body 28 is pulled during the clamping operation with its external thread 72 axially through the tightening bolt 60 against the outwardly facing inclined flank 26 of the internal thread 70 and both an end face clamping between the annular surface 20 and the end surface 22 and also a radial clamping through the hollow shaft 12 bulging or expanding during the clamping operation with the coupling sleeve 16 is achieved.

In the exemplary embodiment illustrated in FIGS. 5c and 5d the tightening bolt 60 engages with an outer cone 61 a conical recess 29 of the clamping body 28. The clamping body 28 can for this purpose be one piece, can be partially axially parallel slotted or, as shown in FIG. 5d, can be divided into several segments connected with one another through a not illustrated expanding ring in order to be able to be expanded preferably in the vicinity of the root of the shaft 12 during tightening of the tightening bolt 60.

In conclusion the following is to be said: The invention relates to a device for connecting two tool parts to a shaft 12 projecting from the first tool part 10 and an annular surface 20 surrounding the shaft 12 at its root and with a coupling sleeve 16 projecting from the second tool part 14 having a recess 18 for receiving the shaft 12, and an end surface 22 which can be pressed against the annular surface 20 during the clamping operation. In order to achieve aside from the end face clamping also a self-centering radial clamping of the shaft 12 within the coupling sleeve 16, the shaft 12 has a cavity 24 axially open toward the front-face end of the shaft and a clamping body 28 axially movably arranged in the cavity 24. The clamping body 20 is loosely screwed with an external thread 72 into an internal thread 70 of the hollow shaft and is locked against rotation. The cavity wall 38 is dimensioned such that it can elastically bulge or expand in radial direction beyond the thread flanks 26, 30 which are inclined toward the shaft opening 32 and can be pressed against the inside of the coupling sleeve 16 when the clamping body 28 is pressed in axial direction.

we claim:

1. In a device for connecting two tool parts including a shaft projecting from a first tool part, an annular surface surrounding said shaft at a root of said shaft, said shaft extending from said root terminating in a front-face shaft end, a coupling sleeve projecting from a second tool part and having an end surface and a recess for receiving said shaft in said end surface, said end surface being adapted to be pressed against said annular surface during a clamping operation, said shaft having a cavity therein and a clamping body arranged in said cavity, said cavity having therein means defining at least one inner shoulder facing inclined away from said front-face shaft end, a clamping surface of said clamping body being axially pressed during said clamping operation against said at least one inner shoulder, said cavity having a wall defining a radially facing external face of said shaft and dimensioned such that it will elastically bulge in a radial direction and against an inside wall of said recess in said coupling sleeve in response to said clamping body being pressed in an axial direction thereof, the improvement wherein said cavity of said shaft has an internal thread therein, wherein said clamping body has an external thread threadedly engaged with said internal thread, and wherein said means defining at least one inner shoulder on said shaft and said clamping surface on said clamping body are formed by a plurality of flanks of both said internal and external threads, said plurality of flanks resting against one another and face inclined toward said front-face shaft end.

2. The device according to claim 1, wherein said clamping body is screwed with said external thread generally tension-free into said internal thread of said shaft and is positively secured against a rotation in said shaft by means defining a rotation locking member.

3. The device according to claim 1, wherein said clamping body has a first crossbore and said cavity wall has opposing crossbores therein, said first crossbore and said opposing crossbores are aligned with one another, wherein a clamping bolt is movably arranged in said first crossbore and said opposing crossbores, wherein said clamping bolt has a cone means on both ends, wherein said coupling sleeve has two holding screws, said two holding screws being guidable, respectively, in diametrically opposite internal threads and having a further cone means facing toward an inside of said coupling sleeve and being reciprocally engaged with said cone means of said clamping bolt, and being clamped with said clamping bolt during said clamping operation, and wherein said clamping bolt and said holding screws have an axial misalignment effecting during said clamping operation both pressing said clamping surface against said inner shoulder of said shaft and also a drawing of said shaft into said recess and a reciprocal pressing together of said annular surface and said end surface.

4. The device according to claim 3, wherein said first crossbore in said clamping body has a smaller diameter than said opposing crossbores in said cavity wall.

5. The device according to claim 3, wherein said clamping bolt has two clamping-bolt parts diametrically opposite to one another in said first crossbore and extends through said opposing crossbores, and wherein an axially movable sliding wedge is arranged between said two clamping-bolt parts extending axially through said clamping body and which rests with wedge surfaces against complementary wedge surfaces of said clamping-bolt parts, wherein said front-face shaft end has a front-face shaft opening, wherein a tightening bolt is received through said front-face shaft opening and is axially movable therein, and wherein a means for effecting relative movement of said axially movable sliding wedge responsive to movement of said tightening bolt is provided.

6. The device according to claim 3, wherein a rotation locking member means for securing said clamping body against rotation relative to said shaft is formed by said clamping bolt extending through said first crossbore and said opposing crossbores.

7. The device according to claim 1, wherein said front-face shaft end has a front-face shaft opening, wherein said clamping body carries a tightening bolt extending through said front-face shaft opening and projecting axially beyond said clamping body.

8. The device according to claim 7, wherein said tightening bolt is screwed to said clamping body.

9. The device according to claim 7, wherein said tightening bolt engages with an outer cone a conical recess of said clamping body, said conical recess converging toward said front-face shaft opening.

10. The device according to claim 3, wherein said first crossbore is aligned transversely with respect to a longitudinal side surface of said clamping body.

11. The device according to claim 2, wherein said means defining the rotation locking member is formed by a threaded pin having a tip screwed essentially radially into said cavity wall and engages with said tip a recess of said clamping body.

12. The device according to claim 1, wherein said internal thread and said external thread are designed as a sharp thread.

13. The device according to claim 1, wherein said shaft has at least one radial recess.

14. The device according to claim 13, wherein said radial recess is arranged inside of said cavity.

15. The device according to claim 13, wherein said radial recess is arranged near said root of said shaft.

16. The device according to claim 13, wherein said radial recess is arranged in an area of said internal thread.

17. The device according to claim 1, wherein said cavity is accessible from outside through a front-face shaft opening provided in said front-face shaft end.

18. The device according to claim 17, wherein said front-face shaft opening is closed off by a shaft lid.

19. The device according to claim 18, wherein said internal thread of said shaft extends near said front face shaft opening, and wherein said shaft lid is screwed with an external thread into the internal thread and is pressed with an annular shoulder thereon against an annular end surface of said shaft.

20. The device according to claim 18, wherein said shaft lid engages with an axial stepped shoulder thereon a corresponding stepped bore of said shaft.

21. The device according to claim 18, wherein said shaft lid is defined by a peripheral bulge, an outside diameter of which is slightly less than a diameter of said shaft near said root of said shaft.

22. The device according to claim 18, wherein said shaft has a shaft section tapering conically toward an end surface, and wherein an outside diameter of said shaft lid is larger in an area of a peripheral flange than a diameter of said shaft in an area of said end surface.

23. The device according to claim 1, wherein said external thread of said clamping body is formed only in sections.

24. The device according to claim 23, wherein said external thread of said clamping body is cut into an end of said clamping body facing an end surface of said shaft.

25. The device according to claim 1, wherein said clamping body has at an end near said front-face shaft end a forming element for attaching a screwdriver.

26. The device according to claim 18, wherein said clamping body has at said front-face shaft opening an axially projecting shoulder for engagement with a corresponding recess of said shaft lid.

27. The device according to claim 1, wherein said clamping body has an axially through cooling-medium bore.

28. The device according to claim 27, wherein said cavity is accessible from outside through a front-face shaft opening provided in said front-face shaft end, wherein said front-face shaft opening is closed off by a shaft lid, wherein a cooling-medium pipe extending between a center opening in said shaft lid and an opening in a base of said cavity on the side of said root and extending through said axially through cooling-medium bore and a transverse recess in said clamping bolt.

29. The device according to claim 28, wherein said cooling-medium pipe is formed on said shaft lid.

30. The device according to claim 28, wherein said cooling-medium pipe (106) is sealingly clamped between said shaft lid and said base.

31. The device according to claim 28, wherein said shaft lid has a recess, which annularly surrounds from outside said center opening.

32. The device according to claim 3, wherein said shaft has at least one wall slot, open toward said opposing crossbores in said wall.

33. The device according to claim 32, wherein said at least one wall slot extends from said opposing crossbores in a direction toward said front-face shaft end and is closed at an end of said at least one wall slot nearest said front-face shaft end.

34. The device according to claim 32, wherein said wall slot extends from said opposing crossbores in a direction toward said annular surface and is closed at a wall slot end nearest said annular surface.

35. The device according to claim 1, wherein said wall has at least two recesses diametrically opposing one another in pairs and are open at an edge toward said front-face shaft end.

36. The device according to claim 1, wherein a means for form-locking and synchronizing rotational movement of said annular surface and said end surface is provided.

37. The device according to claim 1, wherein said shaft has a cylindrical outer surface, and wherein said coupling sleeve has a complementary cylindrical recess.

38. The device according to claim 1, wherein said shaft has a conical outer surface converging toward the front-face shaft end, and wherein said coupling sleeve has a complementary conical recess.

39. The device according to claim 1, wherein said shaft has a double cylindrical outer surface with a diameter which is smaller near said front-face shaft end, and a diameter which is larger near said annular surface, and wherein said coupling sleeve has a complementary double cylindrical recess with a diameter which is smaller on an end complimenting said annular surface and is larger at an opposing end.

* * * * *